(12) United States Patent
Lin et al.

(10) Patent No.: US 12,282,635 B2
(45) Date of Patent: Apr. 22, 2025

(54) TOUCH DISPLAY DEVICE WITH MOISTURE BARRIER LAYER EMBEDDED COMPOSITE SUBSTRATE

(71) Applicant: E Ink Holdings Inc., Hsinchu (TW)

(72) Inventors: Chen Cheng Lin, Hsinchu (TW); Hung Wei Tseng, Hsinchu (TW); Yi Chun Kuo, Hsinchu (TW); Fang Chia Hu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/522,230

(22) Filed: Nov. 29, 2023

(65) Prior Publication Data
US 2024/0310964 A1 Sep. 19, 2024

(30) Foreign Application Priority Data
Mar. 13, 2023 (TW) ................. 112109081

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 2203/04107* (2013.01)

(58) Field of Classification Search
CPC .................................................. G06F 3/0445
See application file for complete search history.

(56) References Cited

U.S. PATENT DOCUMENTS

| 8,830,202 B2 | 9/2014 | Chen |
| 11,063,236 B2 | 7/2021 | Ikeda et al. |
| 2010/0071756 A1* | 3/2010 | Krajewski ............ B32B 27/286 136/251 |
| 2010/0201929 A1 | 8/2010 | Okada et al. |
| 2010/0265207 A1* | 10/2010 | Chen ..................... G06F 3/0445 345/173 |
| 2015/0027541 A1 | 1/2015 | Baisl et al. |

(Continued)

FOREIGN PATENT DOCUMENTS

| TW | 201220262 | 5/2012 |
| TW | I684052 | 2/2020 |

(Continued)

OTHER PUBLICATIONS

"Office Action of Taiwan Counterpart Application", issued on Jul. 22, 2024, p. 1-p. 7.

*Primary Examiner* — William Boddie
*Assistant Examiner* — Andrew B Schnirel
(74) *Attorney, Agent, or Firm* — JCIPRNET

(57) ABSTRACT

A touch display device includes a substrate, a display element layer, a composite substrate, a touch electrode and an adhesive layer. The display element layer is disposed on the substrate. The composite substrate includes a support layer and a moisture barrier layer. The moisture barrier layer is in direct contact with and covers a surface of the support layer. The display element layer is located between the substrate and the composite substrate. A moisture transmission rate of the moisture barrier layer is less than $1\times10^{-2}$ g/m²/day. The touch electrode is disposed on the composite substrate. The adhesive layer is disposed between the display element layer and the composite substrate.

12 Claims, 14 Drawing Sheets

(56) References Cited

U.S. PATENT DOCUMENTS

| | | | |
|---|---|---|---|
| 2017/0269732 A1* | 9/2017 | Chang | G06F 3/0446 |
| 2019/0361559 A1* | 11/2019 | Guo | H10N 30/05 |
| 2022/0083170 A1 | 3/2022 | Liu et al. | |

FOREIGN PATENT DOCUMENTS

| | | |
|---|---|---|
| TW | 202207006 | 2/2022 |
| TW | 202217523 | 5/2022 |

\* cited by examiner

TOUCH DISPLAY DEVICE WITH MOISTURE BARRIER LAYER EMBEDDED COMPOSITE SUBSTRATE

CROSS-REFERENCE TO RELATED APPLICATION

This application claims the priority benefit of Taiwan application serial no. 112109081, filed on Mar. 13, 2023. The entirety of the above-mentioned patent application is hereby incorporated by reference herein and made a part of this specification.

BACKGROUND

Technical Field

The disclosure relates to an electronic device, and particularly relates to a touch display device.

Description of Related Art

In order to take into account multiple functions, many products adopt an approach of bonding components with different functions to implement a multi-function effect. However, such approach inevitably increases an overall thickness of the product, especially when more functions are required, thinning of the product becomes more difficult.

SUMMARY

The disclosure is directed to a touch display device, which uses a composite substrate with a moisture barrier property to carry a touch electrode and even other elements to provide a moisture barrier effect.

The disclosure provides a touch display device including a substrate, a display element layer, a composite substrate, a touch electrode and an adhesive layer. The display element layer is disposed on the substrate. The composite substrate includes a support layer and a moisture barrier layer. The moisture barrier layer is in direct contact and covers a surface of the support layer, wherein the display element layer is located between the substrate and the composite substrate. A moisture transmission rate of the moisture barrier layer is less than $1 \times 10^{-2}$ g/m$^2$/day. The touch electrode is disposed on the composite substrate. The adhesive layer is disposed between the display element layer and the composite substrate.

In an embodiment of the disclosure, the touch electrode includes a first electrode layer and a second electrode layer, and the first electrode layer and the second electrode layer are respectively disposed on two opposite sides of the composite substrate.

In an embodiment of the disclosure, one of the first electrode layer and the second electrode layer is in contact with the support layer, and the other is in contact with the moisture barrier layer.

In an embodiment of the disclosure, the touch electrode includes a first electrode layer and a second electrode layer, and the first electrode layer and the second electrode layer are disposed on a same side of the composite substrate. The touch display device further includes an insulating layer, and the insulating layer is disposed between the first electrode layer and the second electrode layer.

In an embodiment of the disclosure, the moisture transmission rate of the moisture barrier layer is lower than that of the insulating layer.

In an embodiment of the disclosure, the touch display device further includes a driving circuit layer and a common electrode layer. The driving circuit layer and the common electrode layer are respectively disposed on two opposite sides of the display element layer, wherein the driving circuit layer is disposed between the substrate and the display element layer.

In an embodiment of the disclosure, the common electrode layer is disposed between the adhesive layer and the display element layer.

In an embodiment of the disclosure, the adhesive layer is disposed between the common electrode layer and the display element layer.

In an embodiment of the disclosure, the touch display device further includes a shielding conductive layer, and the shielding conductive layer is disposed between the touch electrode and the display element layer.

In an embodiment of the disclosure, the above touch display device further includes a circuit board. The circuit board is bonded to the composite substrate, wherein the circuit board is electrically connected to the shielding conductive layer and also electrically connected to the touch electrode.

In an embodiment of the disclosure, the adhesive layer is disposed between the shielding conductive layer and the composite substrate. The touch display device further includes a conductive element, and the conductive element is disposed between the composite substrate and the shielding conductive layer and penetrates through the adhesive layer.

In an embodiment of the disclosure, the shielding conductive layer is disposed between the adhesive layer and the composite substrate.

In an embodiment of the disclosure, the touch display device further includes an insulating layer and a conductive element. The insulating layer extends between the composite substrate and the shielding conductive layer, and the conductive element is disposed between the shielding conductive layer and the composite substrate, and the conductive element penetrates through the insulating layer.

In an embodiment of the disclosure, the touch electrode is at least partially disposed between the composite substrate and the insulating layer.

Based on the above description, the touch display device of the embodiment of the disclosure uses the composite substrate with the moisture barrier layer as a substrate of a touch panel, so that the touch panel is attached to a display panel through the adhesive layer to provide a touch sensing function and a moisture barrier function to protect the display element layer from being damaged by intruding moisture. Moreover, by using the composite substrate with the moisture barrier layer, it is unnecessary to additionally attach a moisture barrier film layer to provide a moisture barrier effect, which helps to reduce a thickness of the device. The embodiment of the disclosure also proposes to dispose the shielding conductive layer between the touch panel and the display panel to avoid signal interference there between. In addition, the shielding conductive layer and even the common electrode layer of the display panel may be fabricated on the composite substrate to achieve a thinning structure.

DESCRIPTION OF THE EMBODIMENTS

Figure 1:
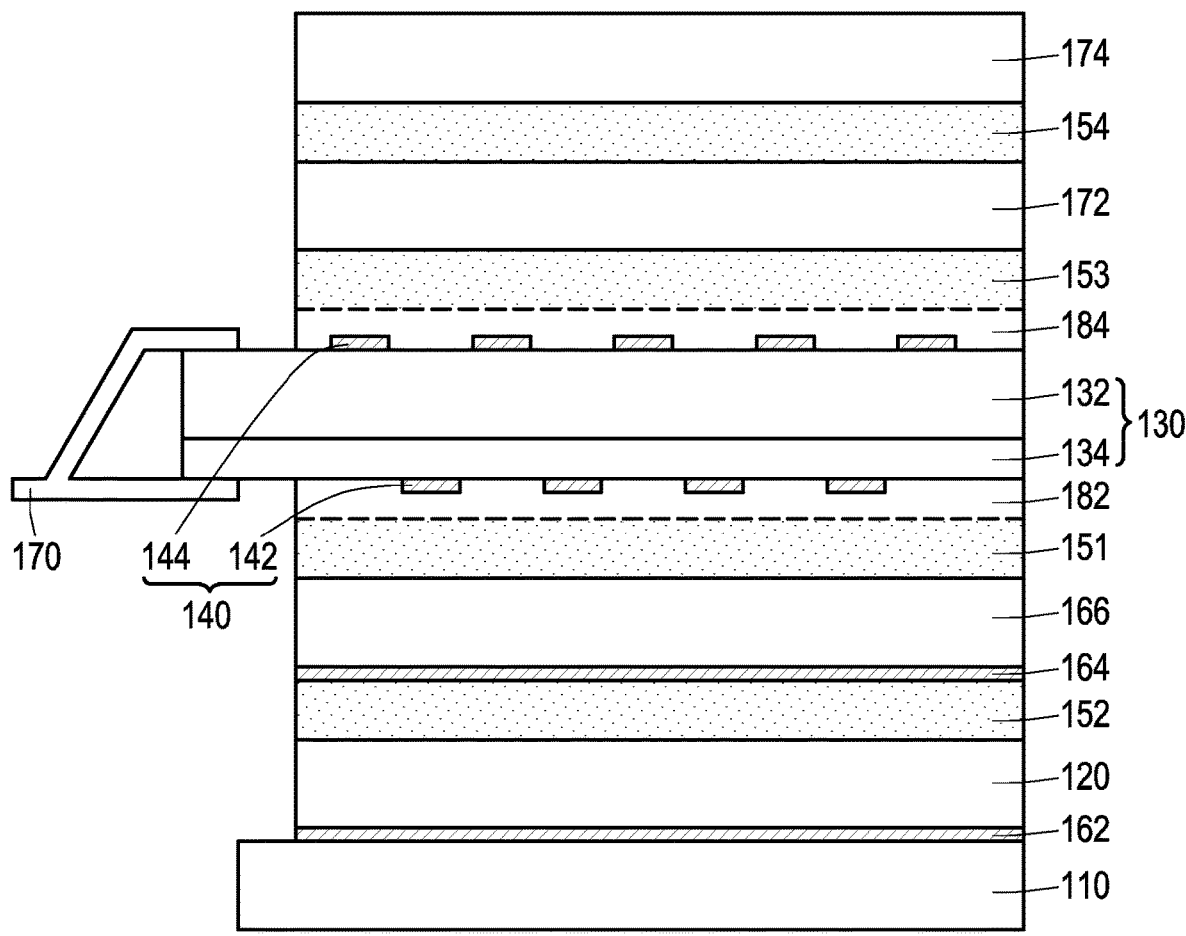
FIG. 1 to FIG. 14 are schematic diagrams of touch display devices according to multiple embodiments of the disclosure.
Figure 2:
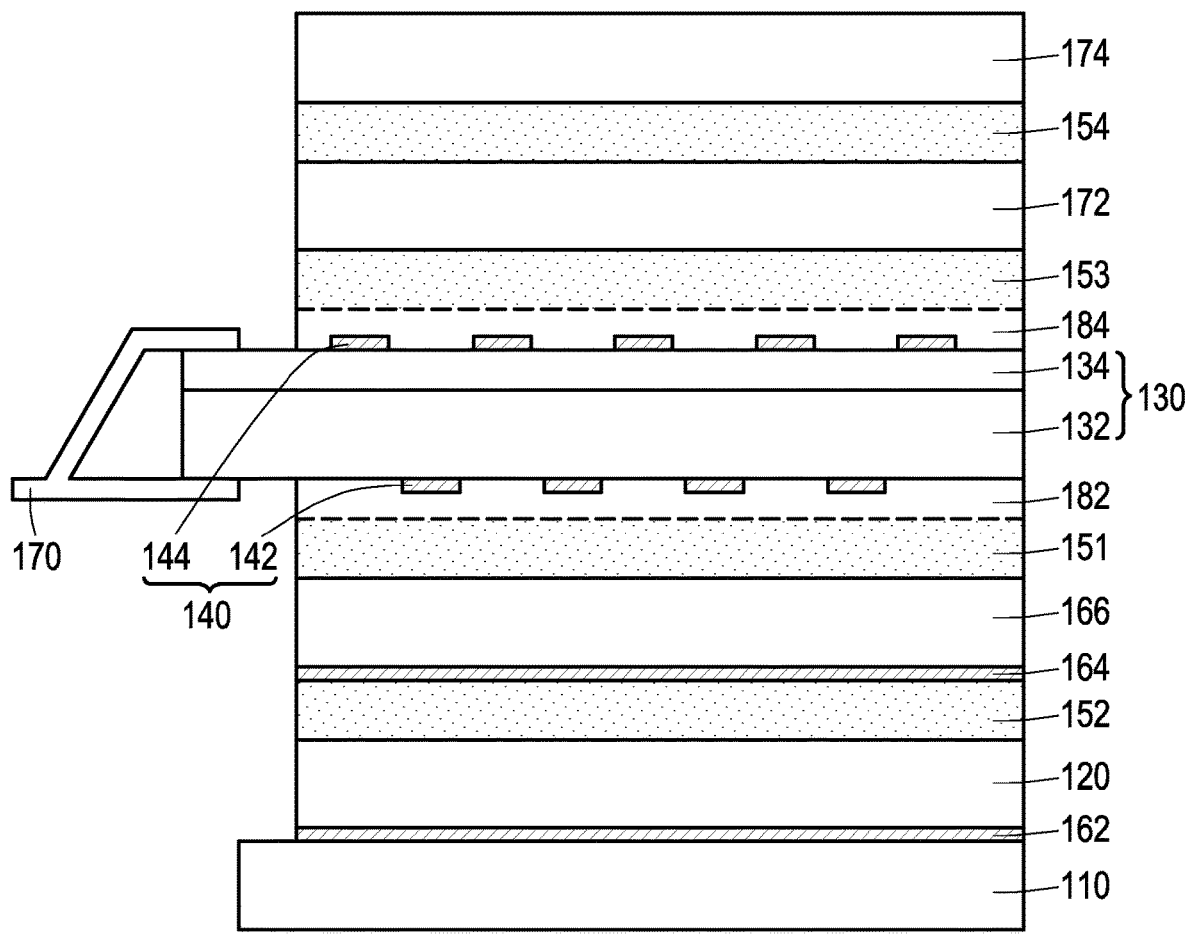

FIG. 1 and FIG. 2 are schematic diagrams of touch display devices according to embodiments of the disclosure. A touch display device 100A in FIG. 1 and a touch display device 100B in FIG. 2 mainly include a substrate 110, a display element layer 120, a composite substrate 130, a touch electrode 140 and an adhesive layer 151. The display element layer 120 is disposed on the substrate 110. The touch electrode 140 are disposed on the composite substrate 130. The adhesive layer 151 is disposed between the display element layer 120 and the composite substrate 130. To be specific, the structure that the display element layer 120 disposed on the substrate 110 may provide a function of displaying images, and may be understood as a display element or a display panel DS. The structure that the touch electrode 140 is disposed on the composite substrate 130 may provide a touch sensing function and may be understood as a touch element or a touch panel TP. The touch display device 100A of FIG. 1 and the touch display device 100B of FIG. 2 use the adhesive layer 151 to bond the touch panel TP and the display panel DS together to realize a touch display function.

The substrate 110 is used to support the display element layer 120. In addition, a material of the substrate 110 may be glass, quartz or an organic polymer, etc. If the material of the substrate 110 is an organic polymer, in practice, the organic polymer is, for example (but not limited to): polyimide (PI), polyethylene terephthalate (PET), polycarbonate (PC), etc. The display element layer 120 may include an electronic ink layer, an electrowetting display layer, an electrophoretic display layer, etc., and is supported by the substrate 110.

The composite substrate 130 includes a support layer 132 and a moisture barrier layer 134. The moisture barrier layer 134 is directly in contact with and covers a surface of the support layer 132. In the embodiment of FIG. 1, the display element layer 120 is located between the substrate 110 and the composite substrate 130, and the moisture barrier layer 134 is located between the support layer 132 and the display element layer 120. However, in the embodiment of FIG. 2, a stacking relationship between the moisture barrier layer 134 and the support layer 132 may be reversed, for example, the support layer 132 is located between the moisture barrier layer 134 and the display element layer 120. Specifically, a main difference between the embodiment of FIG. 1 and the embodiment of FIG. 2 lies in the stacking relationship between the moisture barrier layer 134 and the support layer 132, and descriptions of other elements in the two embodiments may cross-refer to each other.

A material of the support layer 132 may be glass, quartz, or organic polymer, etc. If the material of the substrate 110 may be an organic polymer, in practice, the organic polymer is, for example (but not limited to): polyimide (PI), colorless polyimide (CPI), polyethylene terephthalate (PET), polycarbonate (PC), etc. In some embodiments, the support layer 132 may be flexible. A material of the moisture barrier layer 134 may include an organic material, an inorganic material or a combination thereof. The inorganic material used for the moisture barrier layer 134 includes, for example, oxides such as silicon oxide ($SiO_2$), aluminum oxide ($Al_2O_3$), or nitrides such as silicon nitride ($Si_3N_4$), etc., but the disclosure is not limited thereto. The organic material used for the moisture barrier layer 134 includes, for example, polyvinylidene chloride polymer or similar materials.

In some embodiments, the moisture barrier layer 134 may have higher density, so that a moisture transmission rate of the moisture barrier layer 134 is less than $1 \times 10^{-2}$ g/m$^2$/day, and a better range of the moisture transmission rate is $1 \times 10^{-2}$ to $1 \times 10^{-5}$ g/m$^2$/day. In some embodiments, when an inorganic material, for example, an oxide such as silicon oxide ($SiO_2$), aluminum oxide ($Al_2O_3$), or a nitride such as silicon nitride ($Si_3N_4$), etc., is used to fabricate the moisture barrier layer 134, a manufacturing process with a higher temperature may be used to increase the density of the inorganic material to form the moisture barrier layer 134. Here, during the fabrication of the moisture barrier layer 134, no other elements are disposed on the support layer 132. In other words, the moisture barrier layer 134 is directly fabricated on the support layer 132. In this way, the high temperature for fabricating the moisture barrier layer 134 will not affect other elements of the display touch device 100A or the display touch device 100B, and the moisture barrier layer 134 with good moisture barrier effect may be completed without affecting other elements.

The touch electrode 140 may include a first electrode layer 142 and a second electrode layer 144, which are arranged alternately to provide a touch sensing function. Herein, for the convenience of description, the so-called first electrode layer 142 may be understood as one of the two electrode layers of the touch electrode 140 that is closer to the display element layer 120, while the second electrode layer 144 is the other. In the embodiment shown in FIG. 1 and FIG. 2, the first electrode layer 142 and the second electrode layer 144 are respectively disposed on two opposite sides of the composite substrate 130. One of the first electrode layer 142 and the second electrode layer 144 is in contact with the support layer 132, and the other is in contact with the moisture barrier layer 134. For example, in the embodiment of FIG. 1, the moisture barrier layer 134 is located between the support layer 132 and the display element layer 120, the first electrode layer 142 is in contact with the moisture barrier layer 134, and the second electrode layer 144 is in contact with the support layer 132. In the embodiment of FIG. 2, the support layer 132 may be located between the moisture barrier layer 134 and the display element layer 120, the first electrode layer 142 is in contact with the support layer 132, and the second electrode layer 144 is in contact with the moisture barrier layer 134.

The touch electrode 140 may be a transparent electrode. In some embodiments, a material of the touch electrode 140 is a transparent conductive material. The transparent conductive material may include an inorganic transparent conductive material or an organic transparent conductive material, where the inorganic transparent conductive material includes metal oxides such as indium tin oxide and indium zinc oxide, and the organic transparent conductive material includes conductive polymers (PEDOT), etc. In some embodiments, the touch electrode 140 is formed of a grid-shaped conductive layer, and openings surrounded by grids may transmit light, so that the material of the touch electrode 140 is not limited to the transparent conductive material. For example, the material of the touch electrode 140 may include conductive metal, and the touch electrode 140 is formed of grids of the conductive metal to achieve required light transmittance. In some embodiments, the material of the touch electrode 140 may include silver nanowire, carbon nanotube, graphene etc.

In the embodiment shown in FIG. 1 and FIG. 2, the touch display device 100A and the touch display device 100B further include a driving circuit layer 162 and a common electrode layer 164 for driving the display element layer 120. Specifically, the display panel DS may be composed of, for example, the substrate 110, the display element layer 120, the driving circuit layer 162 and the common electrode layer 164. The driving circuit layer 162 and the common electrode layer 164 are respectively disposed on two opposite sides of the display element layer 120. For example, the driving circuit layer 162 is disposed on the substrate 110 and located between the display element layer 120 and the substrate 110, and the display element layer 120 is located between the common electrode layer 164 and the driving circuit layer 162.

The driving circuit layer 162 may include multiple pixels (not shown) arranged in an array, and the pixels may include active elements (such as transistors) and pixel electrodes connected to the active elements, but the disclosure is not limited thereto. The common electrode layer 164 may be disposed corresponding to the pixels or the pixel electrodes of the driving circuit layer 162, and is input with a common voltage. An individual pixel electrode may be input with a corresponding voltage to drive the display element layer 120 in collaboration with the common voltage of the common electrode layer 164. In some embodiments, the display element layer 120 may be packaged in advance and then bonded to the elements of the driving circuit layer 162, and the common electrode layer 164 is not directly formed on the display element layer 120. For example, the touch display device 100A and the touch display device 100B may further include another support layer 166 and another adhesive layer 152, where the common electrode layer 164 may be disposed on the support layer 166 and attached to the display element layer 120 through the adhesive layer 152.

The touch display device 100A and the touch display device 100B further include a circuit board 170. The circuit board 170 is bonded to the composite substrate 130 and electrically connected to the touch panel TP. In other words, the circuit board 170 may be electrically connected to the touch electrode 140 to provide and receive touch sensing signals. Specifically, the circuit board 170 may be bonded to two opposite sides of the composite substrate 130 to electrically connect the first electrode layer 142 and the second electrode layer 144. The circuit board 170 is, for example, a flexible circuit board, and includes multiple layers of conductive circuits built therein and integrated circuit chips connected to these conductive circuits, but the disclosure is not limited thereto.

The touch display device 100A and the touch display device 100B further include a light guide plate 172 and a cover plate 174. The light guide plate 172 is attached to the touch panel TP through an adhesive layer 153, and the cover plate 174 is, for example, attached to the light guide plate 172 through an adhesive layer 154. When a user views an image displayed on the touch display panel 100A or the touch display panel 100B, the light guide plate 172 is located between the display element layer 120 and the user. The cover plate 174 is, for example, a plate element with good light transmittance, which is used to protect the touch panel TP and the display panel DS. In some embodiments, the display panel DS is reflective, and the light guide plate 172 may cooperate with corresponding light source elements (not shown) to form a front light source, but the disclosure is not limited thereto.

In addition, the touch display devices 100A and 100B may optionally include an insulating layer 182 and an insulating layer 184. The insulating layer 182 and the insulating layer 184 are respectively disposed on the two opposite sides of the composite substrate 130 to cover the first electrode layer 142 and the second electrode layer 144 of the touch electrode 140. For example, the first electrode layer 142 may be located between the composite substrate 130 and the insulating layer 182, and the second electrode layer 144 may be located between the composite substrate 130 and the insulating layer 184. The insulating layer 182 and the insulating layer 184 may be used as protective layers for protecting the electrode layers. In addition, the insulating layer 182 is located between the adhesive layer 151 and the first electrode layer 142, and the insulating layer 184 is located between the adhesive layer 153 and the second electrode layer 144, which may prevent the first electrode layer 142 and the second electrode layer 144 from being contaminated by the adhesive material or other contamination caused by a manufacturing process of the adhesive layer 151 and the adhesive layer 153 or defects such as short circuit of the conductive elements. In some embodiments, the insulating layer 182 and the insulating layer 184 may be omitted, so that in FIG. 1 and FIG. 2, the insulating layer 182 and the insulating layer 184 are represented by dotted lines. In an implementation where the insulating layer 182 and the insulating layer 184 are omitted, the adhesive layer 151 may be directly in contact with the first electrode layer 142, and the adhesive layer 153 may be directly in contact with the second electrode layer 144.

A material of the insulating layer 182 and the insulating layer 184 may include an inorganic insulating material or an organic insulating material. In some embodiments, the material of the insulating layer 182 and the insulating layer 184 may be the same as that of the moisture barrier layer 134, but the moisture transmission rate of the moisture barrier layer 134 is lower than that of the insulating layer 182 and the insulating layer 184. For example, the insulating layer 182, the insulating layer 184, and the moisture barrier layer 134 may all be made of oxides, such as silicon oxide, or nitrides, such as silicon nitride, but the moisture barrier layer 134 may be fabricated by using a manufacturing process with a higher temperature, while the insulating layer 182 and the insulating layer 184 are fabricated by using a manufacturing process with a lower temperature. In this way, a fabrication temperature of the insulating layer 182 and the insulating layer 184 will not cause damage to the touch electrode 140.

In the embodiment shown in FIG. 1 and FIG. 2, the structure that the touch electrode 140 is disposed on the composite substrate 130 may be regarded as the touch panel TP. Since the composite substrate 130 has the moisture barrier layer 134, the touch panel TP has a moisture barrier function. The touch panel TP is attached to the display panel DS through the adhesive layer 151, which not only provides a touch sensing function, but also blocks moisture to prevent the display element layer 120 from being damaged by intruding moisture. In this way, the touch display device 100A and the touch display device 100B do not need to attach an additional moisture barrier element on the display panel DS, which helps to reduce a thickness of the product.

Figure 3:
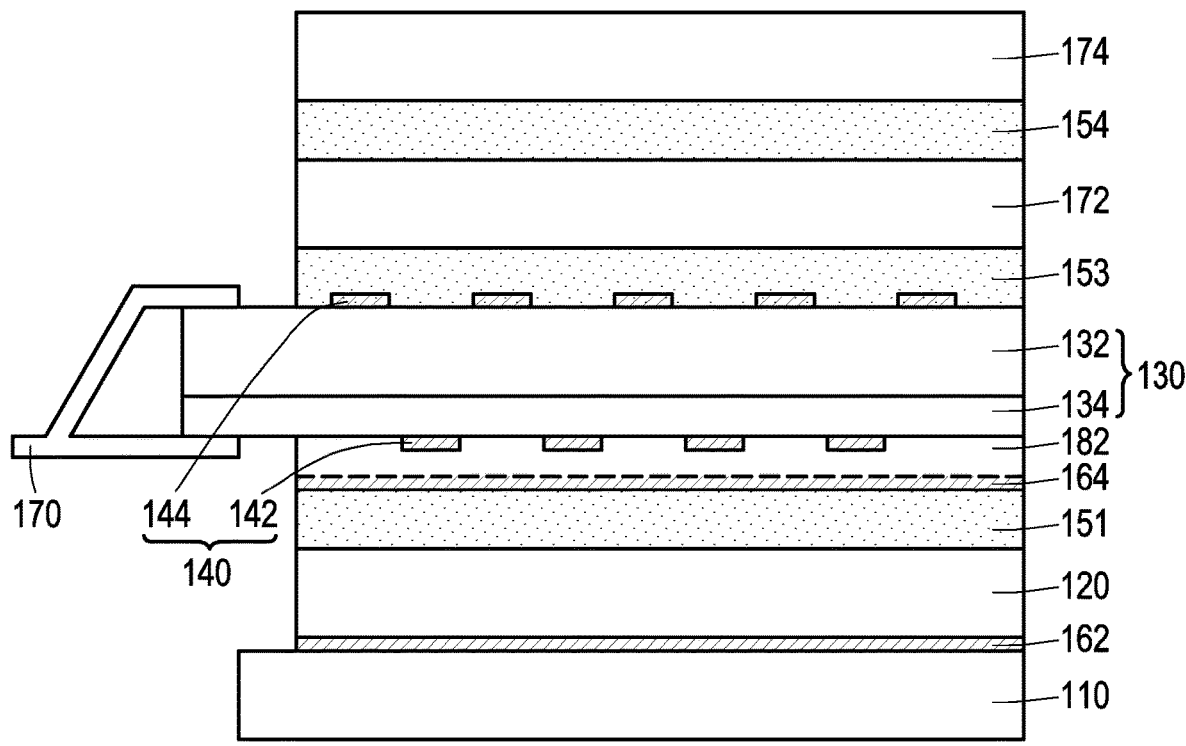
Figure 4:
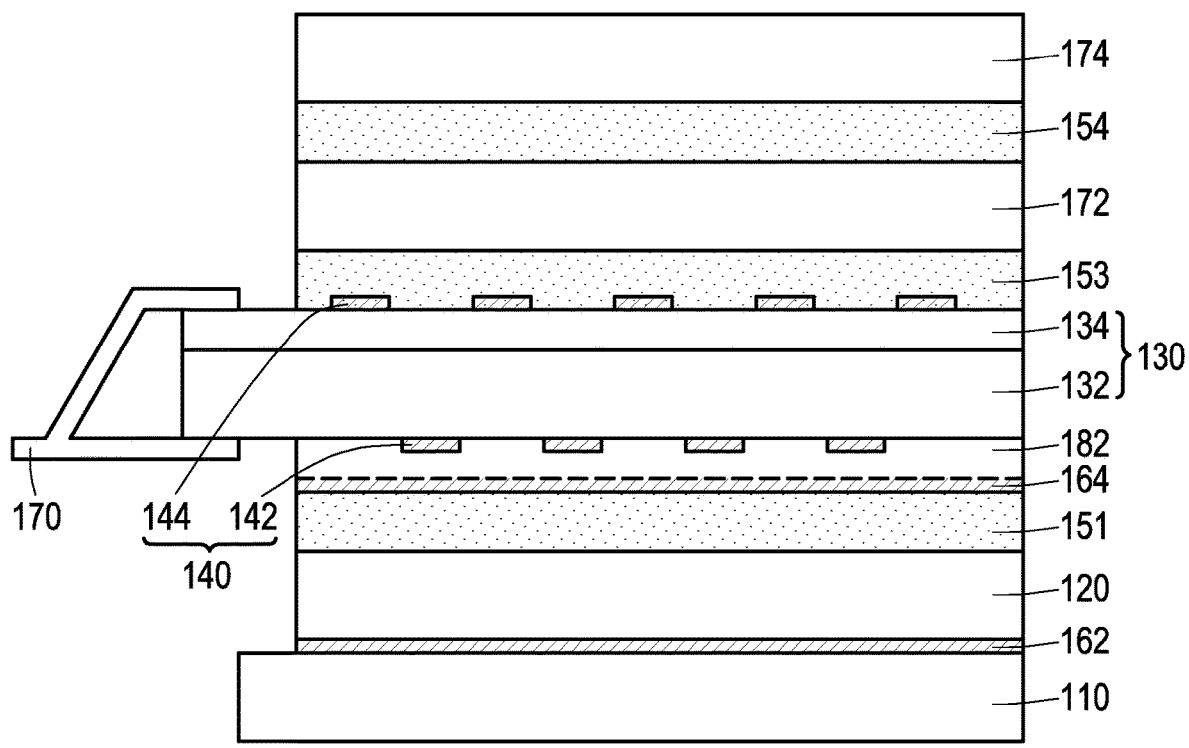

FIG. 3 and FIG. 4 are schematic diagrams of touch display devices according to embodiments of the disclosure. A touch display device 100C of FIG. 3 and a touch display device 100D of FIG. 4 mainly include the substrate 110, the display element layer 120, the composite substrate 130, the touch electrode 140 and the adhesive layer 151. The display element layer 120 is disposed on the substrate 110. The touch display device 100C and the touch display device 100D are substantially similar to the aforementioned touch display device 100A and the touch display device 100B and further include the driving circuit layer 162, the common electrode layer 164, the circuit board 170, the light guide plate 172, the cover plate 174, the adhesive layer 153, the adhesive layer 154 and the insulating layer 182. In the embodiments of FIG. 1 to FIG. 4, the same reference numerals represent the same or similar elements, so that the descriptions of the elements in these embodiments may cross-refer to each other, and details thereof will not be repeated. Specifically, the touch display device 100C is substantially similar to the touch display device 100A, but the adhesive layer 151 of the touch display device 100C is disposed between the common electrode layer 164 and the display element layer 120. Similarly, the touch display device 100D is substantially similar to the touch display device 100B, but the adhesive layer 151 of the touch display device 100D is disposed between the common electrode layer 164 and the display element layer 120.

Specifically, in the touch display device 100C and the touch display device 100D, the common electrode layer 164 is fabricated on the composite substrate 130 and then attached to the display element layer 120 through the adhesive layer 151, and the touch display device 100C and the touch display device 100D do not need the support layer 166 in FIG. 1 and FIG. 2 and do not need the adhesive layer 152 in FIG. 1 and FIG. 2. In this way, the touch display device 100C and the touch display device 100D have a thinner thickness. In order to separate the common electrode layer 164 from the first electrode layer 142 of the touch electrode 140, the touch display device 100C and the touch display device 100D must include the insulating layer 182. In addition, although FIG. 3 and FIG. 4 show that the adhesive layer 153 is in contact with the second electrode layer 144, the touch display device 100C and the touch display device 100D may optionally further include the insulating layer 184 of FIG. 1 and FIG. 2.

Figure 5:
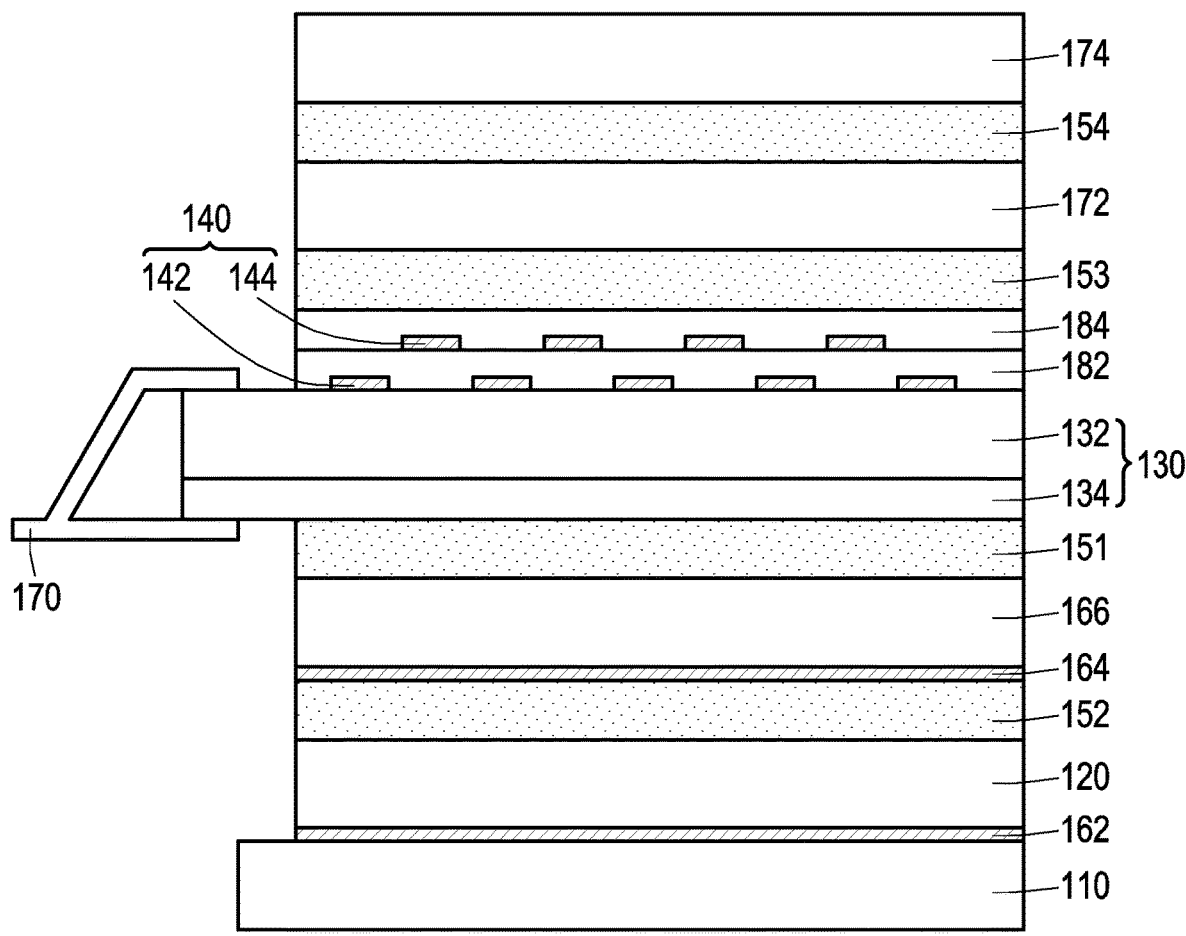
Figure 6:
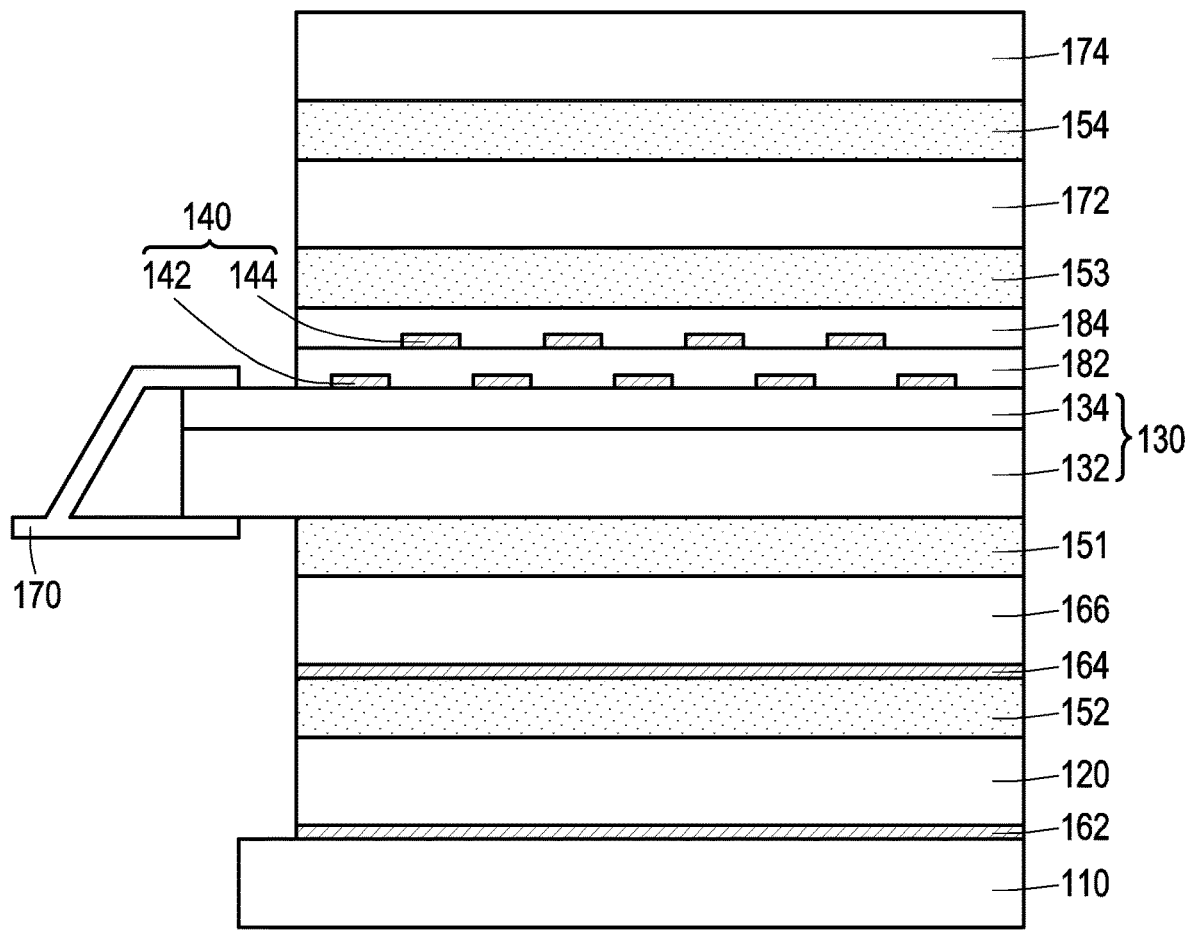

FIG. 5 and FIG. 6 are schematic diagrams of touch display devices according to embodiments of the disclosure. A touch display device 100E in FIG. 5 and a touch display device 100F in FIG. 6 mainly include the substrate 110, the display element layer 120, the composite substrate 130, the touch electrode 140 and the adhesive layer 151. The display element layer 120 is disposed on the substrate 110. The touch display device 100E and the touch display device 100F are substantially similar to the aforementioned touch display device 100A and the touch display device 100B and further include the driving circuit layer 162, the common electrode layer 164, the support layer 166, the circuit board 170, the light guide plate 172, the cover plate 174, the adhesive layer 152, the adhesive layer 153, the adhesive layer 154, the insulating layer 182 and the insulating layer 184. In FIG. 1, FIG. 2, FIG. 5 and FIG. 6, the same reference numerals are used to denote the same or substantially the same elements, and the descriptions of these elements may cross-refer to each other. Therefore, descriptions of the same materials, structures, functions, configurations, etc., of these elements will not be repeated.

Specifically, the touch display device 100E in FIG. 5 is substantially similar to the touch display device 100A in FIG. 1, and a main difference there between is that in the touch display device 100E of FIG. 140, the insulating layer 182 and the insulating layer 184 are all located on the same side of composite substrate 130. The touch electrode 140 includes the first electrode layer 142 and the second electrode layer 144. The first electrode layer 142 is disposed on the composite substrate 130 and, for example, in contact with the support layer 132 of the composite substrate 130. The insulating layer 182 covers the first electrode layer 142 to sandwich the first electrode layer 142 between the insulating layer 182 and the support layer 132 of the composite substrate 130. The second electrode layer 144 is disposed on the insulating layer 182, and the insulating layer 184 covers the second electrode layer 144 to sandwich the second electrode layer 144 between the insulating layer 182 and the insulating layer 184. In other words, in the touch display device 100E of FIG. 5, the touch electrode 140 is disposed on a single side of the composite substrate 130. In this way, the adhesive layer 151 may be in contact with the moisture barrier layer 134 of the composite substrate 130. In addition, for the configuration relationship of other elements of the touch display device 100E in FIG. 5, reference may be made to the relevant description in FIG. 1.

The touch display device 100F in FIG. 6 is substantially similar to the touch display device 100B in FIG. 2, and a main difference there between is that in the touch display device 100F of FIG. 6, the touch electrode 140, the insulating layer 182 and the insulating layer 184 are all located on the same side of the composite substrate 130. In addition, in the touch display device 100F of FIG. 6, the support layer 132 of the composite substrate 130 is located between the display element layer 120 and the moisture barrier layer 134 of the composite substrate 130. Therefore, in the touch display device 100F of FIG. 6, the first electrode layer 142 of the touch electrode 140 is in contact with the moisture barrier layer 134 of the composite substrate 130, and the adhesive layer 151 is in contact with the support layer 132 of the composite substrate 130. In addition, for the configuration relationship of other elements of the touch display device 100F in FIG. 6, reference may be made to the relevant description in FIG. 2.

Figure 7:
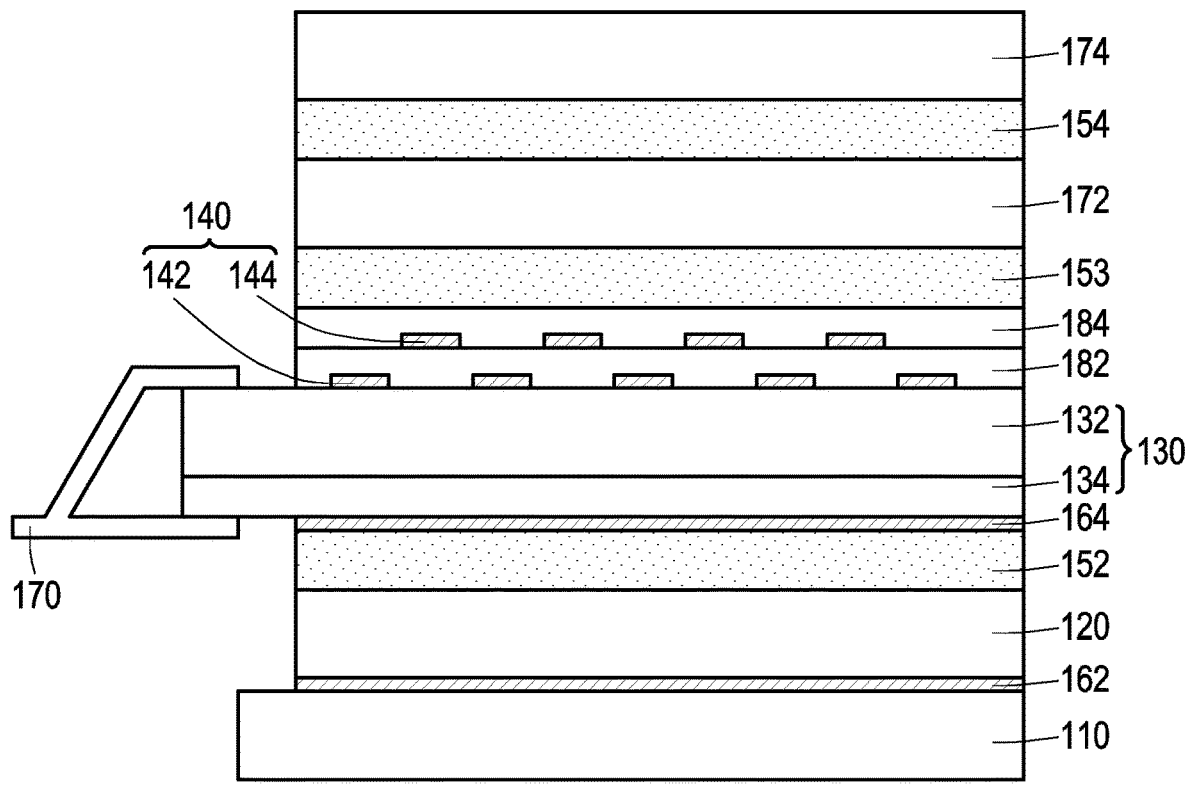
Figure 8:
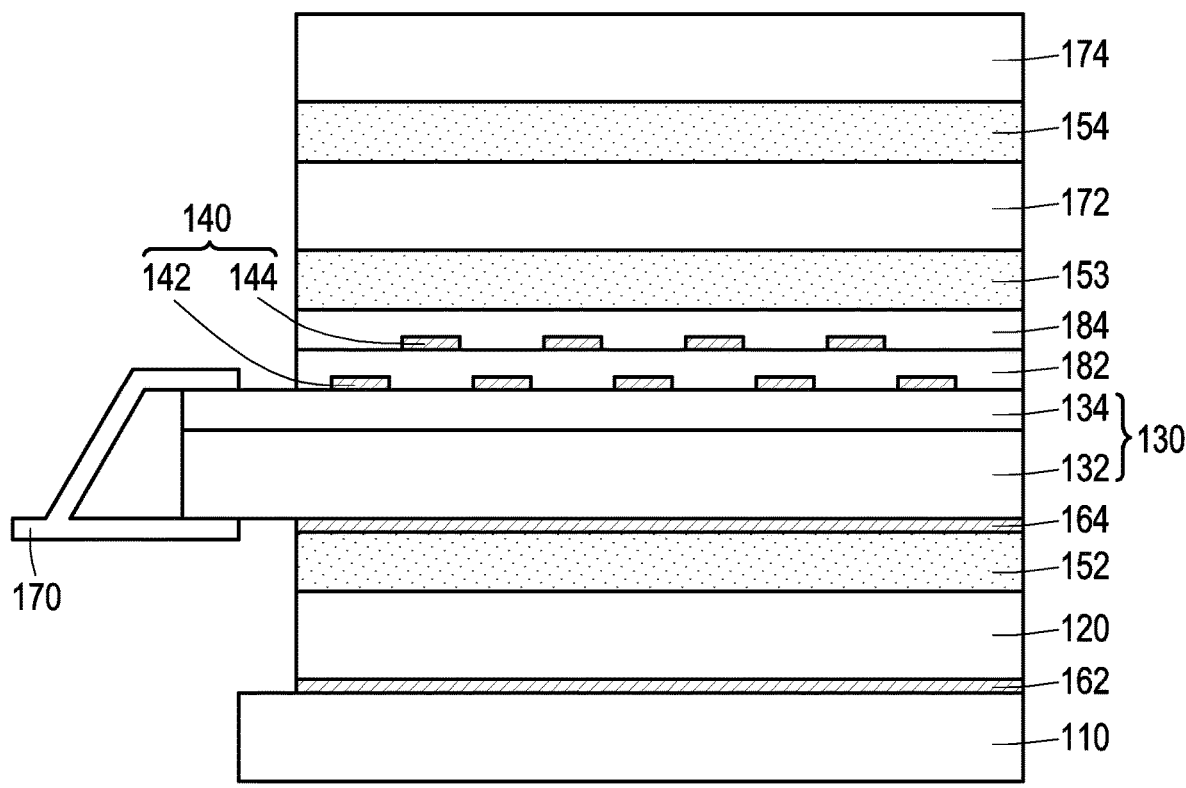

FIG. 7 and FIG. 8 are schematic diagrams of touch display devices according to embodiments of the disclosure. A touch display device 100G in FIG. 7 and a touch display device 100H in FIG. 8 mainly include the substrate 110, the display element layer 120, the composite substrate 130, the touch electrode 140 and the adhesive layer 151. The display element layer 120 is disposed on the substrate 110. The touch display device 100G and the touch display device 100H are substantially similar to the aforementioned touch display device 100C and the touch display device 100D and further include the driving circuit layer 162, the common electrode layer 164, the circuit board 170, the light guide plate 172, the cover plate 174, the adhesive layer 153, the adhesive layer 154, the insulating layer 182 and the insulating layer 184.

The touch display device 100G in FIG. 7 is substantially similar to the touch display device 100C in FIG. 3, and a main difference there between is that in the touch display device 100G of FIG. 7, both of the electrode layer 142 and the second electrode layer 144 of the touch electrode 140 are located on the same side of the composite substrate 130. Meanwhile, the insulating layer 182 and the insulating layer 184 are also located on the same side of the composite substrate 130, so that the first electrode layer 142 is sandwiched between the composite substrate 130 and the insulating layer 182, and the second electrode layer 144 is sandwiched between the insulating layer 182 and the insulating layer 184. In addition, in the touch display device 100G of FIG. 7, the common electrode layer 164 may be fabricated on the composite substrate 130 and directly in contact with the composite substrate 130. Here, the first electrode layer 142 is in contact with, for example, the support layer 132 of the composite substrate 130 and the common electrode layer 164 is in contact with, for example, the moisture barrier layer 134 of the composite substrate 130.

The touch display device 100H in FIG. 8 is substantially similar to the touch display device 100D in FIG. 4, but a main difference there between is that in the touch display device 100H of FIG. 8, both of the first electrode layer 142 and the second electrode layer 144 are located on the same side of the composite substrate 130. Meanwhile, the insulating layer 182 and the insulating layer 184 are also located on the same side of the composite substrate 130, so that the first electrode layer 142 is sandwiched between the composite substrate 130 and the insulating layer 182, and the second electrode layer 144 is sandwiched between the insulating layer 182 and the insulating layer 184.

The touch display device 100H of FIG. 8 is substantially similar to the touch display device 100G of FIG. 7, and a difference there between is that in the touch display device 100H, the support layer 132 of the composite substrate 130 is located between the display element layer 120 and the moisture barrier layer 134 of the composite substrate 130, and in the touch display device 100G, the moisture barrier layer 134 of the composite substrate 130 is located between the display element layer 120 and the support layer 132 of the composite substrate 130. Therefore, in FIG. 8, the common electrode layer 164 is in contact with the support layer 132 of the composite substrate 130, and the first electrode layer 142 is in contact with the moisture barrier layer 134 of the composite substrate 130.

Figure 9:
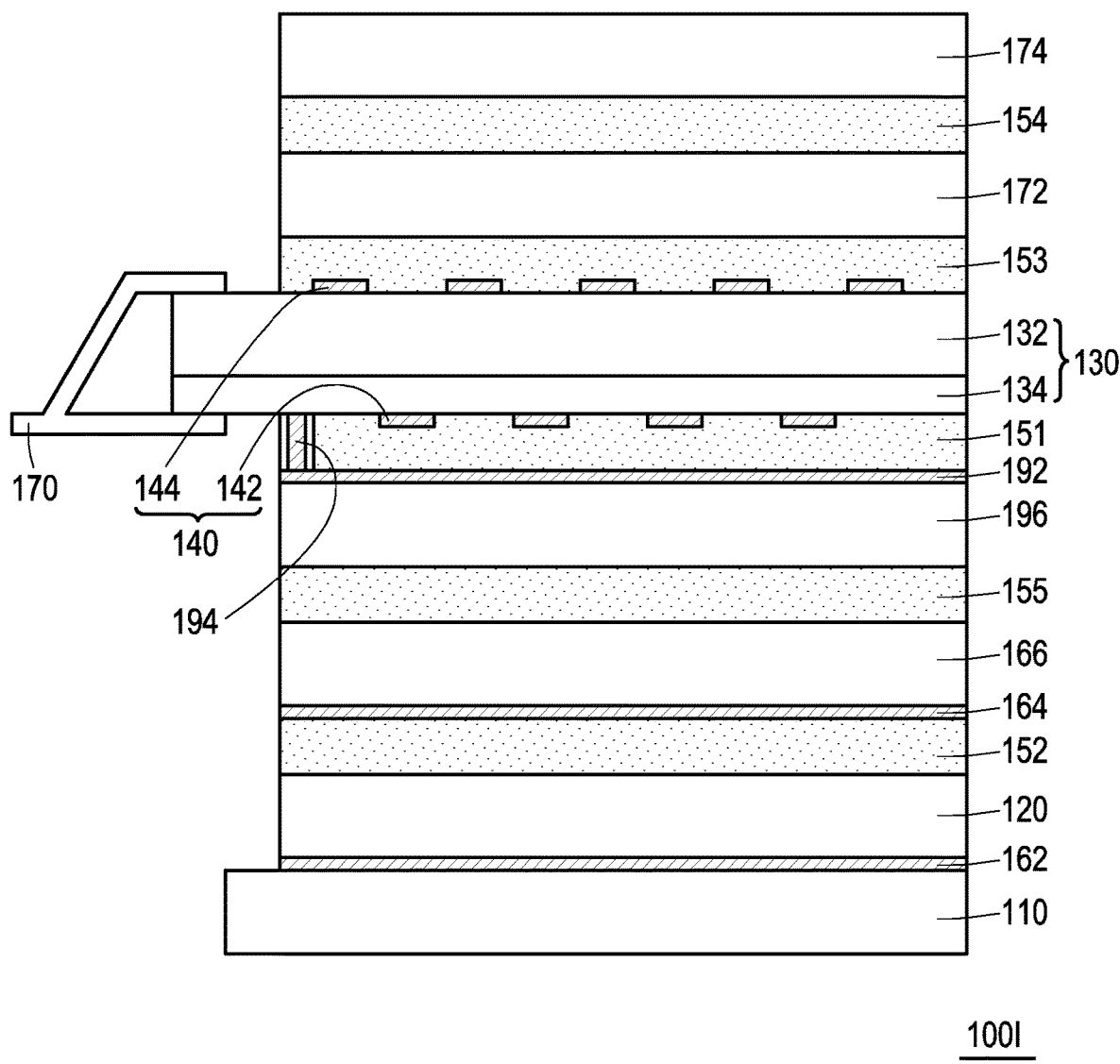

FIG. 9 is a schematic diagram of a touch display device according to an embodiment of the disclosure. A touch display device 100I in FIG. 9 mainly includes the substrate 110, the display element layer 120, the composite substrate 130, the touch electrode 140 and the adhesive layer 151. The display element layer 120 is disposed on the substrate 110. The composite substrate 130 includes the support layer 132 and the moisture barrier layer 134. The moisture barrier layer 134 is directly in contact with and covers the surface of the support layer 132. The display element layer 120 is located between the substrate 110 and the composite substrate 130, and the moisture transmission rate of the moisture barrier layer 134 is less than $1 \times 10^{-2}$ g/m$^2$/day, and the moisture transmission rate of the moisture barrier layer 134 ranges from $1 \times 10^{-2}$ to $1 \times 10^{-5}$ g/m$^2$/day. The touch electrode 140 is disposed on the composite substrate 130, and the adhesive layer 151 is disposed between the display element layer 120 and the composite substrate 130.

The touch display device 100I is substantially similar to the aforementioned touch display device 100A and further includes the driving circuit layer 162, the common electrode layer 164, the support layer 166, the circuit board 170, the light guide plate 172, the cover plate 174, the adhesive layer 152, the adhesive layer 153 and the adhesive layer 154 that have been described in the above embodiments. In the embodiment, for configuration relationships of the substrate 110, the display element layer 120, the composite substrate 130, the touch electrode 140, the adhesive layer 151, the driving circuit layer 162, the common electrode layer 164, the support layer 166, the circuit board 170, the light guide plate 172, the cover plate 174, the adhesive layer 152, the adhesive layer 153 and the adhesive layer 154, reference may be mad to the relevant descriptions of FIG. 1, and details thereof will not be repeated here. In addition, the touch display panel 100I may optionally further include the insulating layer 182 and the insulating layer 184 shown in FIG. 1. Although FIG. 9 illustrates that the moisture barrier layer 134 of the composite substrate 130 is located between the display element layer 120 and the support layer 132, in other embodiments the support layer 132 may be located between the display element layer 120 and the moisture barrier layer 134, as shown in FIG. 2.

The touch electrode 140 and the composite substrate 130 may constitute the touch panel TP, and the substrate 110, the display element layer 120, the driving electrode layer 162 and the common electrode layer 164 may constitute the display panel DS. In addition, the touch display device 100I further includes a shielding conductive layer 192, and the shielding conductive layer 192 is disposed between the touch electrode 140 and the display element layer 120. The shielding conductive layer 192 may be used to shield signal interference between the touch panel TP and the display panel DS. The shielding conductive layer 192 may have a ground potential to provide an electrical shielding effect. Specifically, the touch display device 100I further includes a conductive element 194, where the conductive element 194 is disposed between the composite substrate 130 and the shielding conductive layer 192 and penetrates through the adhesive layer 151. The conductive element 194 may electrically connect the shielding conductive layer 192 to conductor traces (not shown) on the composite substrate 130 and electrically connect the same to the circuit board 170 through the conductor traces (not shown) on the composite substrate 130. In this way, the circuit board 170 may be electrically connected to the shielding conductive layer 192 and also electrically connected to the touch electrode 140, and the shielding conductive layer 192 may be electrically connected to the circuit board 170 through the conductive element 194 to have the ground potential. The conductive element 194 may be a conductive post made of conductive metal, but the disclosure is not limited thereto.

The shielding conductive layer 192 may be disposed between the shielding touch panel TP and the display panel DS in an attaching manner. For example, the touch display device 100I further includes a support layer 196, and the shielding conductive layer 192 is prefabricated on the support layer 196 and then attached to the composite substrate 130 through the adhesive layer 151. Meanwhile, the touch display device 100I further includes an adhesive layer 155, where the adhesive layer 155 is disposed between the support layer 196 and the support layer 166 to attach the shielding conductive layer 192 and the touch panel TP to the common electrode layer 164 of the display panel DS.

Figure 10:
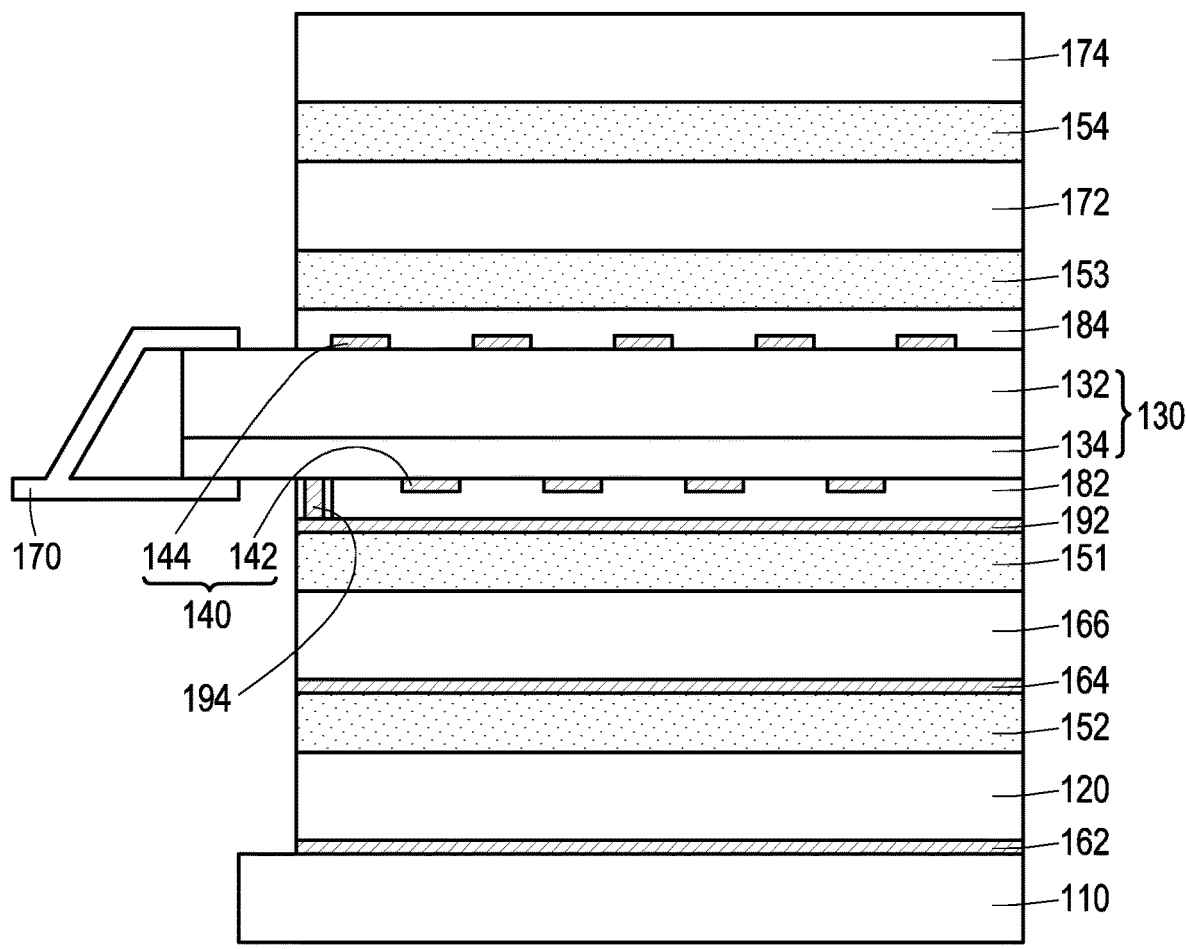

FIG. 10 is a schematic diagram of a touch display device according to an embodiment of the disclosure. A touch display device 100J in FIG. 10 mainly includes the substrate 110, the display element layer 120, the composite substrate 130, the touch electrode 140, and the adhesive layer 151, and further includes the driving circuit layer 162, the common electrode layer 164, the support layer 166, the circuit board 170, the light guide plate 172, the cover plate 174, the adhesive layer 152, the adhesive layer 153, the adhesive layer 154, the insulating layer 182 and the insulating layer 184 that have been described in the embodiment of FIG. 1. In the embodiment, for configuration relationships of the substrate 110, the display element layer 120, the composite substrate 130, the touch electrode 140, the adhesive layer 151, the driving circuit layer 162, the common electrode layer 164, the support layer 166, the circuit board 170, the light guide plate 172, the cover plate 174, the adhesive layer 152, the adhesive layer 153, the adhesive layer 154, the insulating layer 182 and the insulating layer 184, reference may be made to related description of the embodiment of FIG. 1, and details thereof will not be repeated here.

As shown in FIG. 10, the touch display device 100J further includes a shielding conductive layer 192, and the shielding conductive layer 192 is disposed between the touch electrode 140 and the display element layer 120. Specifically, the shielding conductive layer 192 is disposed between the adhesive layer 151 and the composite substrate 130. In the touch display device 100J, the insulating layer 182 extends between the composite substrate 130 and the shielding conductive layer 192 and at least a part of the touch electrode 140 (for example, the first electrode layer 142) is disposed between the composite substrate 130 and the insulating layer 184. In this way, the insulating layer 182 may separate the shielding conductive layer 192 from the first electrode layer 142 of the touch electrode 140, so that the first electrode layer 142 of the touch electrode 140 is electrically independent. In addition, the touch display device 100J further includes the conductive element 194, wherein the conductive element 194 is disposed between the shielding conductive layer 192 and the composite substrate 130 and the conductive element 194 penetrates through the insulating layer 182, so that the conductive element 194 is electrically connected to conductor traces (not shown) on the composite substrate 130, and is electrically connected to the circuit board 170 through the conductor traces (not shown) on the composite substrate 130. In this way, the circuit board 170 may be electrically connected to the shielding conductive layer 192 and also electrically connected to the touch electrode 140.

In some embodiments, the moisture barrier layer 134 of the composite substrate 130, the first electrode layer 142, the insulating layer 182, and the shielding conductive layer 192 may be sequentially fabricated on the support layer 132 of the composite substrate 130 without stacking these film layers together through an additional adhesive layer. Therefore, in the touch display device 100J, a multi-functional film layer may be formed on the single support layer 132 without using an additional adhesive layer or an additional support layer, which helps to achieve a thinner structural design. In addition, although FIG. 10 illustrates that the moisture barrier layer 134 of the composite substrate 130 is located between the display element layer 120 and the support layer 132, but in other embodiments, the support layer 132 may be located between the display element layer 120 and the moisture barrier layer 134, as shown in FIG. 2.

Figure 11:
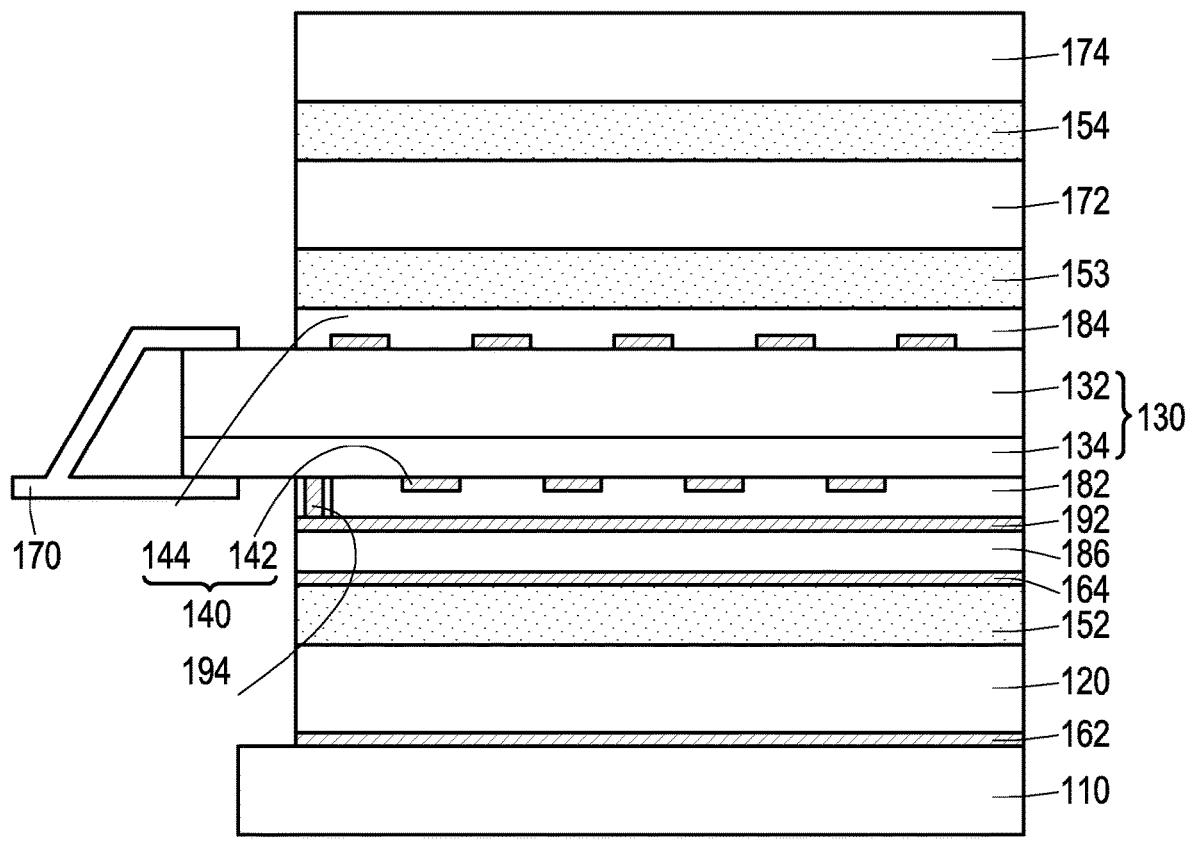

FIG. 11 is a schematic diagram of a touch display device according to an embodiment of the disclosure. A touch display device 100K in FIG. 11 is substantially similar to the touch display device 100J in FIG. 10, so that descriptions of elements in these embodiments may cross-refer to each other, and details of the elements are not repeated. Specifically, the touch display device 100K is substantially similar to the touch display device 100J, but the adhesive layer 151 of the touch display device 100K is disposed between the common electrode layer 164 and the display element layer 120. In other words, the common electrode layer 164 is first fabricated on the composite substrate 130 and then attached to the display element layer 120 through the adhesive layer 151. In addition, in order to separate the common electrode layer 164 from the shielding conductive layer 192, the touch display device 100K further includes an insulating layer 186. The insulating layer 186 is disposed between the common electrode layer 164 and the shielding conductive layer 192.

Figure 12:
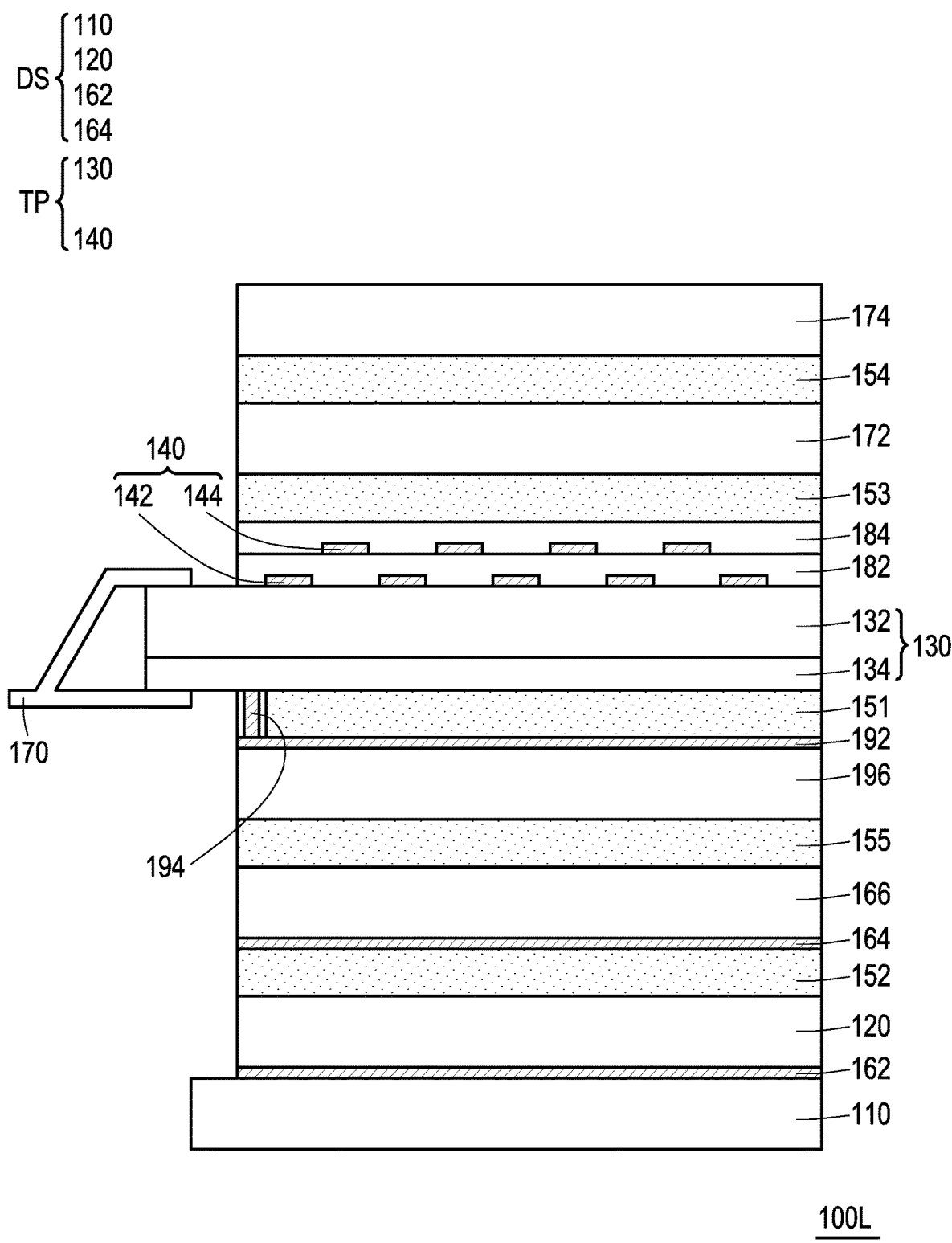

FIG. 12 is a schematic diagram of a touch display device according to an embodiment of the disclosure. A touch display device 100L in FIG. 12 mainly includes the substrate 110, the display element layer 120, the composite substrate 130, the touch electrode 140, and the adhesive layer 151, and also includes the driving circuit layer 162, the common electrode layer 164, The support layer 166, the circuit board 170, the light guide plate 172, the cover plate 174, the adhesive layer 152, the adhesive layer 153, the adhesive layer 154, the adhesive layer 155, the shielding conductive layer 192, the conductive element 194 and the support layer 196 that have been described in the embodiment of FIG. 9. In addition, the touch display device 100L further includes the insulating layer 182 and the insulating layer 184 not shown in FIG. 9. Specifically, the touch display device 100L is substantially similar to the touch display device 100I, so the descriptions of the individual elements in the two embodiments may cross-refer to each other. However, the touch display device 100L is different from the touch display device 100I mainly in that the touch electrode 140 of the touch display device 100L is disposed on a single side of the composite substrate 130.

In the embodiment, the touch electrode 140 includes the first electrode layer 142 and the second electrode layer 144. The first electrode layer 142, the insulating layer 182, the second electrode layer 144 and the insulating layer 184 are sequentially stacked on the same side of the composite substrate 130. In addition, the adhesive layer 151 is disposed on the other side of the composite substrate 130. Meanwhile, the shielding conductive layer 192 is carried by the support layer 196 and attached to the composite substrate 130 through the adhesive layer 151. In the embodiment, the adhesive layer 151 may be in contact with the composite substrate 130 and the shielding conductive layer 192, but the disclosure is not limited thereto. Although FIG. 12 illustrates that the moisture barrier layer 134 of the composite substrate 130 is located between the display element layer 120 and the support layer 132, but in other embodiments, the support layer 132 may be located between the display element layer 120 and the moisture barrier layer 134, as shown in FIG. 4.

Figure 13:
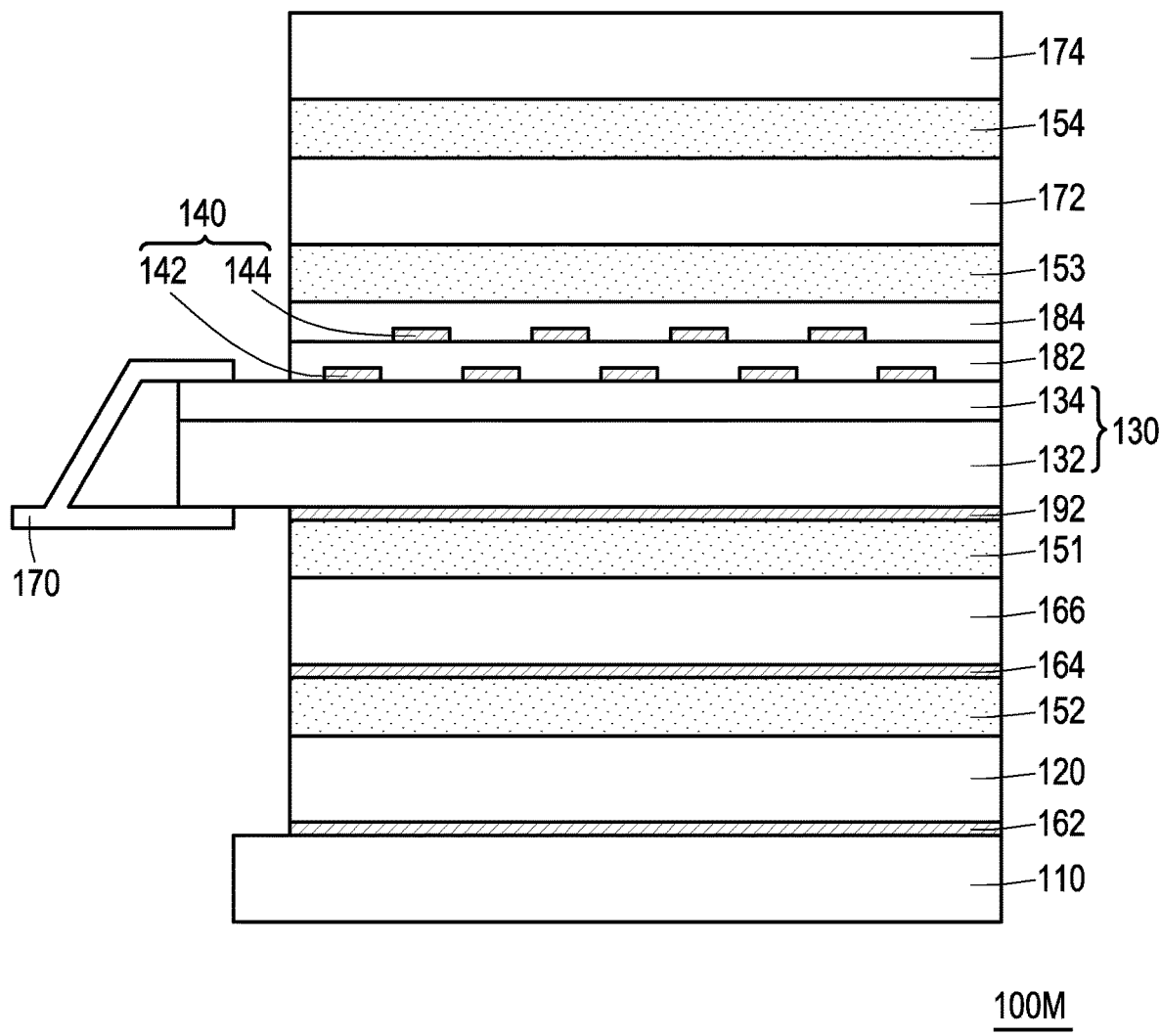

FIG. 13 is a schematic diagram of a touch display device according to an embodiment of the disclosure. A touch display device 100M in FIG. 13 is substantially similar to the touch display device 100L of FIG. 12, so that the descriptions of the elements with the same reference numbers in the two embodiments may cross-refer to each other. The touch display device 100M is different from the touch display device 100L mainly in that the shielding conductive layer 192 of the touch display device 100M is disposed between the adhesive layer 151 and the composite substrate 130. The shielding conductive layer 192 may be in contact with the composite substrate 130 in the touch display device 100M, and may be directly and electrically connected to the circuit board 170 bonded to the composite substrate 130. Therefore, the touch display device 100M may not need the conductive element 194 in FIG. 12. In addition, the shielding conductive layer 192 may be directly fabricated on the composite substrate 130 without being bonded to the composite substrate 130 in an attaching manner. Therefore, the touch display device 100M does not need the support layer 196 and the adhesive layer 155 in FIG. 12, which helps to reduce a thickness of the touch display device 100M.

Figure 14:
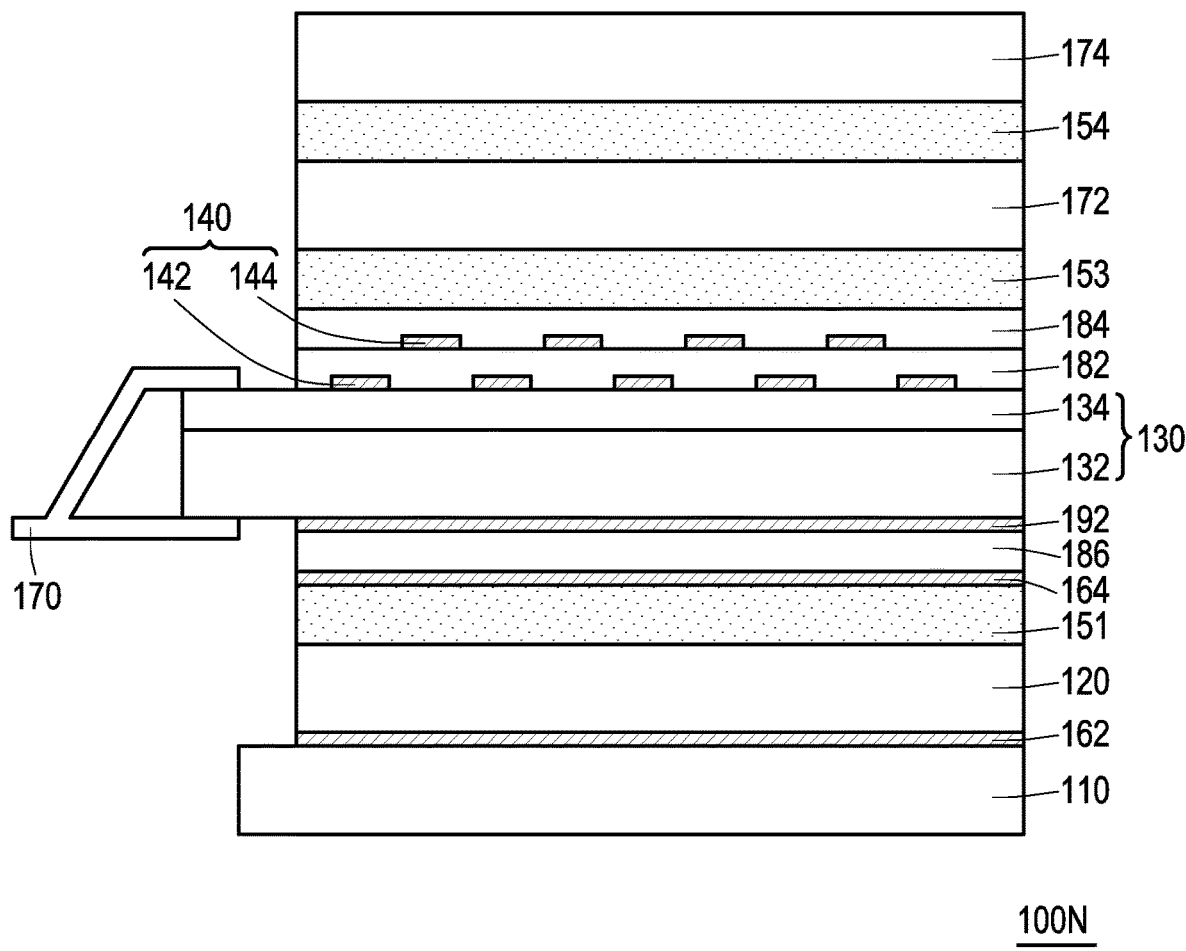

FIG. 14 is a schematic diagram of a touch display device according to an embodiment of the disclosure. A touch display device 100N of FIG. 14 is substantially similar to the touch display device 100M of FIG. 13, so that the descriptions of the elements with the same reference numerals in the two embodiments may cross-refer to each other. A main difference between the touch display device 100N and the touch display device 100M is that the common electrode layer 164 of the touch display device 100N is also integrated into the composite substrate 130, and does not need to be combined with the composite substrate 130 in the attaching manner. For example, the adhesive layer 151 of the touch display device 100N is disposed between the common electrode layer 164 and the display element layer 120. The common electrode layer 164 is first fabricated on the composite substrate 130 and then attached to the display element layer 120 through the adhesive layer 151. In addition, in order to separate the common electrode layer 164 from the shielding conductive layer 192, the touch display device 100N further includes an insulating layer 186. The insulating layer 186 is disposed between the common electrode layer 164 and the shielding conductive layer 192.

In FIG. 14, the touch electrode 140 is disposed on the same side of the composite substrate 130, and the shielding conductive layer 192, the insulating layer 186 and the common electrode layer 164 are sequentially disposed on the other side of the composite substrate 130. In this way, the composite substrate 130 carries elements/film layers with multiple functions, and may provide multiple functions such as moisture barrier, touch sensing, and common electrode, etc., without using additional carrying layers and additional adhesive layers, which helps to reduce the thickness of the touch display device 100N.

In the embodiments of FIG. 1 to FIG. 14, the so-called fabricating a film layer or element on a support layer refers to forming conductive or insulating materials on the support layer through a film deposition technique, such as physical vapor deposition, chemical vapor deposition, coating, jet printing, printing, etc. Therefore, the so-called fabricating a film layer or element on the support layer may be understood as that the support layer and the fabricated film layer or element do not need to be bonded together through an adhesive layer. Therefore, to fabricate a film layer or element on the support layer does not significantly increase the thickness of the overall device.

In summary, in the touch display devices of the embodiments of the disclosure, the moisture barrier layer is fabricated on the support layer of the touch panel, and there is no need to configure the moisture barrier layer in the touch display device in the attaching manner, so that a thinner structure may be achieved. In addition, in the touch display devices of the embodiments of the disclosure, it is also mentioned that the common electrode layer of the display panel is fabricated on the support layer of the touch panel, which further reduces the adhesive layers for attachment and reduces the support layer for carrying the common electrode layer, thereby achieving a thinner design. Furthermore, the embodiments of the disclosure propose that a shielding conductive layer is provided between the touch panel and the display panel to avoid signal interference between the touch panel and the display panel. In the embodiment of the disclosure, the shielding conductive layer may be fabricated on the support layer of the touch panel, so that the requirement of volume thinning may be met.

What is claimed is:

1. A touch display device, comprising:
   a substrate;
   a display element layer, disposed on the substrate;
   a composite substrate, comprising a support layer and a moisture barrier layer, the moisture barrier layer being in direct contact with and covering a surface of the support layer, wherein the display element layer is located between the substrate and the composite substrate, and a moisture transmission rate of the moisture barrier layer is less than $1 \times 10^{-2}$ g/m$^2$/day;
   a touch electrode, disposed on the composite substrate, wherein the touch electrode comprises a first electrode layer and a second electrode layer respectively disposed on two opposite sides of the composite substrate, and one of the first electrode layer and the second electrode layer is in contact with the support layer, and the other is in contact with the moisture barrier layer; and
   an adhesive layer, disposed between the display element layer and the composite substrate.

2. The touch display device as recited in claim 1, wherein a range of a moisture transmission rate of the moisture barrier layer is $1 \times 10^{-2}$ to $1 \times 10^{-5}$ g/m$^2$/day.

3. The touch display device as recited in claim 1, wherein the touch electrode comprises a first electrode layer and a second electrode layer disposed on the same side of the composite substrate, and the touch display device further comprises an insulating layer disposed between the first electrode layer and the second electrode layer.

4. The touch display device as recited in claim 3, wherein a moisture transmission rate of the moisture barrier layer is lower than a moisture transmission rate of the insulating layer.

5. The touch display device as recited in claim 1, further comprising a driving circuit layer and a common electrode layer respectively disposed on two opposite sides of the display element layer, wherein the driving circuit layer is disposed between the substrate and the display element layer.

6. The touch display device as recited in claim 5, wherein the common electrode layer is disposed between the adhesive layer and the display element layer, or the adhesive layer is disposed between the common electrode layer and the display element layer.

7. The touch display device as recited in claim 1, further comprising a shielding conductive layer, disposed between the touch electrode and the display element layer.

8. The touch display device as recited in claim 7, further comprising a circuit board, bonded to the composite substrate, wherein the circuit board is electrically connected to the shielding conductive layer and also electrically connected to the touch electrode.

9. The touch display device as recited in claim 7, wherein the adhesive layer is disposed between the shielding conductive layer and the composite substrate, and the touch display device further comprises a conductive element disposed between the composite substrate and the shielding conductive layer and penetrating through the adhesive layer.

10. The touch display device as recited in claim 7, wherein the shielding conductive layer is disposed between the adhesive layer and the composite substrate.

11. The touch display device as recited in claim 10, further comprising an insulating layer and a conductive element, wherein the insulating layer extends between the composite substrate and the shielding conductive layer, and the conductive element is disposed between the shielding conductive layer and the composite substrate, and the conductive element penetrates through the insulating layer.

12. The touch display device as recited in claim 11, wherein the touch electrode is at least partially disposed between the composite substrate and the insulating layer.

* * * * *